（12） United States Patent  (10) Patent No.: US 8,769,343 B2
Jaramillo  (45) Date of Patent: Jul. 1, 2014

(54) COMPLIANCE MODE DETECTION FROM LIMITED INFORMATION

(75) Inventor: Kenneth Jaramillo, Gilbert, AZ (US)

(73) Assignee: NXP B.V., Eindhoven (NL)

( * ) Notice: Subject to any disclaimer, the term of this patent is extended or adjusted under 35 U.S.C. 154(b) by 379 days.

(21) Appl. No.: 13/164,325

(22) Filed: Jun. 20, 2011

(65) Prior Publication Data

US 2012/0317446 A1 Dec. 13, 2012

Related U.S. Application Data

(60) Provisional application No. 61/495,738, filed on Jun. 10, 2011.

(51) Int. Cl.
*G06F 11/00* (2006.01)

(52) U.S. Cl.
USPC .................. 714/43; 702/117; 714/25; 714/56

(58) Field of Classification Search
USPC .................................. 702/117; 714/25, 43, 56
See application file for complete search history.

(56) References Cited

U.S. PATENT DOCUMENTS

| | | | | |
|---|---|---|---|---|
| 5,432,775 | A * | 7/1995 | Crayford | 370/248 |
| 5,610,903 | A * | 3/1997 | Crayford | 370/213 |
| 6,744,810 | B1 | 6/2004 | Iyer | |
| 8,654,890 | B2 * | 2/2014 | Jin et al. | 375/296 |
| 2005/0031065 | A1 | 2/2005 | Gupta et al. | |
| 2005/0225365 | A1 * | 10/2005 | Wood | 327/141 |
| 2007/0008035 | A1 * | 1/2007 | Liu et al. | 330/253 |
| 2007/0073942 | A1 * | 3/2007 | Gregorius et al. | 710/71 |
| 2010/0105319 | A1 | 4/2010 | Yeung et al. | |
| 2012/0087405 | A1 * | 4/2012 | Cheung et al. | 375/232 |
| 2013/0156088 | A1 * | 6/2013 | Jin et al. | 375/236 |

FOREIGN PATENT DOCUMENTS

CN 1456976 A 11/2003

OTHER PUBLICATIONS

Anonymous; "Universal Serial Bus 3.0 Specification, Rev. 1.0" UBS; retrieved from the Internet http://www/usb.org/developers/docs/ retrieved on Jan. 20, 2009; 485 pages (uploaded in 6 parts) (Nov. 12, 2008).
Pericom; "PI3EQX7701"; datasheet; 7 pages (Jul. 29, 2009).
Pericom; "PI3EQX7711"; datasheet; 8 pages (Jul. 30, 2009).
Texas Instruments; "Dual Channel USB3.0 Redriver/Equalizer—SN65LVPE502"; datasheet; 27 pages (Apr. 2010).
Anonymous; "PS8710A/B USB 3.0 Bidirection Repeaters—Product Brief"; Parade Technologies, Inc.; retrieved from the Internet: www.paradetech.com/wp-content/uploads/2010/11/PS870-Product-Brief-201011051.pdf, retrieved on Sep. 12, 2012; 1 page (Nov. 30, 2010).

(Continued)

*Primary Examiner* — Joshua P Lottich

(57) ABSTRACT

Consistent with embodiments of the present disclosure, a method involves a redriver circuit with compliance test mode features. A redriver circuit is configured to process received compliance patterns for a compliance test mode. A compliance test mode is detected by a redriver circuit having a first input port and a second input port. The redriver detects the presence of a remote receiver termination on both input ports, monitors both input ports to detect received data and enters compliance test mode in response to no received data being detected on the input ports for a set period of time. Compliance patterns are tracked by monitoring for valid signal levels on the second input port. De-emphasis is controlled on at least one input port in response thereto.

20 Claims, 5 Drawing Sheets

(56) References Cited

OTHER PUBLICATIONS

Texas Instruments; "SN65LVPE502CP EVM User's Guide"; 30 pages (May 2011).

Anonymous; "Improved Signal Integrity and System Reliability for USB 3.0 SuperSpeed Interface" retrieved from the Internet: http://ics.nxp.com/literature/leaflets/interface/pdf/ptn36241b.pdf retrieved Sep. 12, 2012 NXP Semiconductors N.V.; 2 pages (Sep. 30, 2011).

Extended European Search report for European application No. 12170567.7 (Sep. 28, 2012).

* cited by examiner

COMPLIANCE MODE DETECTION FROM LIMITED INFORMATION

This patent document claims benefit under 35 U.S.C. §119 to U.S. Provisional Patent Application Ser. No. 61/495,738, entitled "Compliance Mode Detection From Limited Information" and filed on Jun. 10, 2011, which is fully incorporated herein by reference.

Serial communications/interconnect protocols provide efficient mechanisms to communicate between different devices. These protocols can include standards that define signal properties, timing and state changes required for compatibility with the protocol. One serial communications protocol is the Universal Serial Bus (USB) protocol. USB has been widely adopted in the electronics industry. USB 3.0 is the next generation of USB protocols and offers a 5 Gbps data rate. This protocol was adapted from PCI Express and offers improvements in speed over USB 2.0 as well as significant power savings. USB 3.0 can be used in many different devices including, but not limited to, laptops, desktops, external hard drives, printers, and cell phones.

With such advances in speed come more complex design challenges. Many times the integrated circuit (IC) chips that provide the communications functionality (e.g., USB Host Controllers, USB Hubs, USB Devices) are located quite far from the connectors. For instance, a single IC chip might provide multiple, different ports, each port capable of communications with a different device. The ports might be linked to different connectors and/or to different devices on the same printed circuit board (PCB). These different components can be located at disparate locations, making placement of the single IC non-ideal for all components. Moreover, the single IC may function as a bridge to a different communications protocol, which has its own set of requirements. This can further limit the possible locations for the IC to be placed on the PCB. Accordingly, the distance from the IC to a connector or device might be far enough to result in degradation in the high speed (USB 3.0) signal to such an extent that some sort of redriver or retimer is necessary to restore the signal at the connector to an ideal level.

A redriver provides signal conditioning that can correct for signal degradation. More complex redrivers can also correct for other errors, e.g., a retiming redriver can correct for timing errors. Accordingly, the IC chip need not be designed for the worst case scenario and inclusion of redriver devices can allow computer chips to be designed for lower cost, lower power, and potentially somewhat non-(USB) compliance. The redriver is then expected to restore the incoming signal to valid signal levels.

The USB 3.0 protocol defines a compliance testing operation that a USB compliant device must perform. This compliance testing involves information being passed in both directions, as well as different signal conditioning requirements depending upon the current portion of the compliance testing being implemented. The USB protocol does not provide any mechanism to determine what portion of the compliance test is being implemented without knowledge of data being passed to and from the USB device.

Embodiments of the present disclosure are directed towards a method for configuring a redriver circuit to process received compliance patterns for a compliance test mode, the method comprising: detecting a compliance test mode for a redriver circuit having a first input port and a second input port by detecting the presence of a remote receiver termination on both input ports; monitoring both input ports to detect received data; and entering compliance test mode in response to no received data being detected on the input ports for a set period of time; tracking compliance patterns on the first input port by monitoring for valid signal levels on the first input port; and disabling (or enabling) de-emphasis on the first input port in response to the tracked compliance patterns.

Certain embodiments are directed toward a compliance test mode designed for the Universal Serial Bus (USB) 3.0 protocol. The direction of the compliance patterns can be determined and the step of disabling de-emphasis can be implemented in response to determining the direction of the compliance pattern.

Aspects of the present disclosure are also directed towards a method comprising detecting a compliance mode for a redriver circuit having a first input port and a second input port by detecting the presence of a remote receiver termination on both input ports; monitoring both input ports to detect received data; and determining compliance mode in response to no received data being detected on the input ports for a set period of time; monitoring each input port to detect a valid data signal level; configuring, in response to detecting a valid signal level on a first port, the first port with de-emphasis and the second port without de-emphasis.

Various embodiments of the present disclosure are directed toward a redriver circuit comprising: logic circuitry for detecting a compliance test mode for a redriver circuit having a first input port and a second input port by detecting the presence of a remote receiver termination on both input ports; monitoring both input ports to detect received data; and entering compliance test mode in response to no received data being detected on the input ports for a set period of time; tracking compliance patterns by monitoring for valid signal levels on the first input port; and disabling de-emphasis on the first input port in response to the tracked compliance patterns.

The above discussion is not intended to describe each embodiment or every implementation. Various example embodiments may be more completely understood in consideration of the following detailed description in connection with the accompanying drawings, in which.

Figure 1:
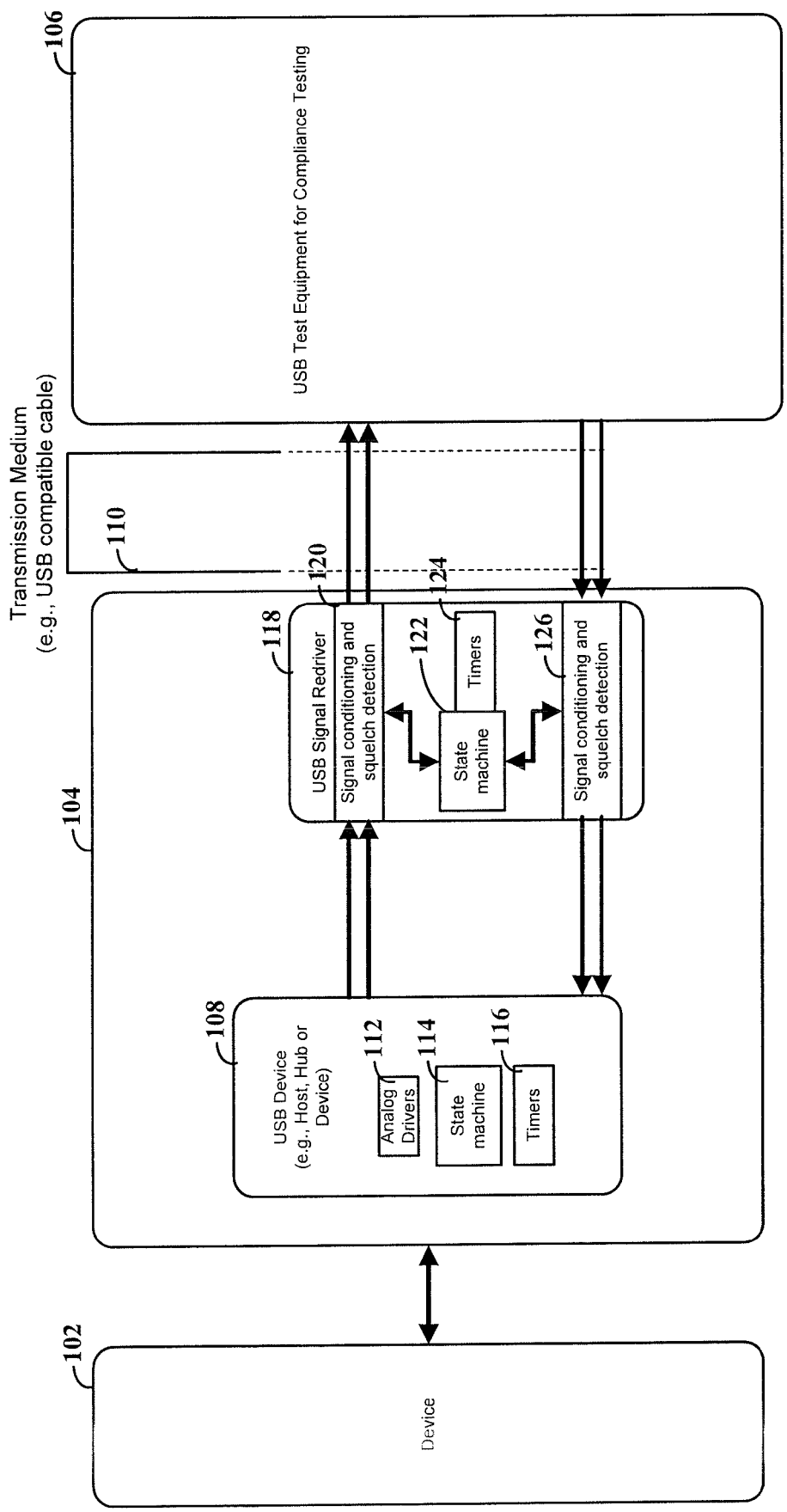
FIG. 1 depicts a block diagram of a system that includes a serial communications device and redriver circuit, consistent with embodiments of the present disclosure.

While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure. Furthermore, the term "example" as used throughout this document is by way of illustration, and not limitation.

Aspects of the present disclosure are directed to compliance mode testing in redriver circuits and related approaches, their uses and systems for the same. While the present disclosure is not necessarily limited to such applications, various aspects of the disclosure may be appreciated through a discussion of various examples using this context.

Embodiments of the present disclosure are directed towards a redriver circuit configured for use with a serial communications protocol that includes a compliance testing mode. The redriver circuit is configured to detect entrance into the compliance testing mode by monitoring for valid data signals. The redriver circuit is also configured to track states within the compliance testing mode by continuing to monitor for valid data signals. In response to the tracked states, the redriver circuit modifies signal conditioning on respective channels (e.g., by enabling and disabling de-emphasis).

Embodiments of the present disclosure are directed toward a redriver circuit and/or a method of using a redriver circuit. The redriver circuit determines state information for a serial communications link by monitoring power-up conditions, reset conditions, valid signals (squelch determinations) and one or more timers. The serial communications link provides bi-directional communications over two unidirectional channels oriented to transmit/receive data in opposite directions. The redriver circuit detects a power-up or reset condition and begins a timer. If a valid signal level is not detected before the timer expires, the redriver circuit is configured to operate in a compliance mode. Once in the compliance mode, the redriver circuit monitors each of the two unidirectional channels for a valid signal level. Upon detecting a valid signal level on one of the two unidirectional channels, the redriver circuit determines which side of the redriver circuit is connected to the device under compliance testing and which side is connected to the device initiating/controlling the compliance testing. The redriver circuit then monitors the appropriate channel for valid data in order to track the compliance states and to modify how data signals carried on the two unidirectional channels are conditioned (e.g., by enabling or disabling de-emphasis). Consistent with specific embodiments of the present disclosure, the redriver circuit does not recover the clock and data from the two unidirectional channels.

Particular embodiments of the present disclosure are directed toward a redriver circuit designed for use with the USB 3.0 specification. The USB 3.0 specification describes the method to place USB devices into a compliance mode. The USB 3.0 specification also describes how to determine which compliance patterns to generate and which patterns contain or don't contain de-emphasis. Test equipment can signal that the USB device should go into compliance mode. In particular, the test equipment can present a load on the USB device's downstream connection. This causes the device under test to start the USB 3.0 training sequence, which begins with a low frequency period signaling (LFPS) polling sequence. The test equipment allows the USB device to timeout and enter compliance mode by failing to transmit valid data during a timeout period.

Once compliance mode is entered, the device under test will start sending the first compliance pattern defined in the USB 3.0 specification. The test equipment studies the received data and generates the USB 3.0 LFPS Ping signaling upstream. This causes the USB device under test to switch to the second compliance pattern defined in the USB 3.0 specification. The test equipment continues with its compliance testing by studying each compliance pattern from the USB device and generating LFPS Ping signaling to cause the USB device to switch to each successive compliance pattern. In this way the test equipment can verify the operation and quality of the USB device transmissions.

The USB 3.0 protocol defines an LFPS.ping signal as a repeating high low differential clock pattern with periodicity of the pattern that is within a certain range (e.g., between 20 and 100 ns) and the length of the clock pattern between electrical idle periods also having a certain range (e.g., from 40 to 200 ns). For instance, the USB 3 specification explains that a LFPS Ping is a repeating 1010 pattern where the bus is held in electrical idle before and after the pattern. In certain instances, a USB testing device might provide a nonstandard LFPS.ping signal (e.g., an electrical idle, followed by a single differential high or low pulse, followed by electrical idle). While this nonstandard signal might match the overall duration of an LFPS.ping burst (40 to 200 ns), it would not be in full compliance with a repeating differential clock pattern defined in the USB 3.0 specification. Another possible nonstandard LFPS.ping signal is a burst of noise generated by unplugging and replugging the USB connector. Accordingly, aspects of the present disclosure are directed toward detecting LFPS.ping that may not be in strict compliance with the USB 3.0 specification.

Consistent with embodiments of the present disclosure, USB redriver devices do not process the USB traffic. The redriver devices can manipulate the USB signal in an analog manner to perform receive equalization, modify the output voltage, and potentially add/modify/remove de-emphasis; however, they do not recover the embedded clock and data that is part of the USB link. Accordingly, the redriver devices are configured to monitor whether or not the signal on the line is a valid differential signal (valid differential voltage). From this information, the redriver devices determine the state the USB Link is in (Rx.Detect, Polling, U0, U1, Compliance, etc. . . . ) and support redriver operations. More specifically, the redriver devices can detect and facilitate compliance mode operation.

Aspects of the present disclosure recognize that redrivers which offer no control over de-emphasis during compliance testing can corrupt USB traffic. For instance, the USB 3.0 specification can require that the upstream traffic requires de-emphasis to be disabled and the downstream traffic requires de-emphasis to be either enabled or disabled (depending upon the particular compliance pattern being generated). Aspects of the present disclosure recognize that a redriver device that offers basic control over de-emphasis via pins or registers would be implemented with software drivers in a product using the redriver (and being tested). These software drivers would need to be aware of the presence of the USB 3.0 redriver and then control the redriver in such a way to facilitate compliance testing (e.g., by manually enabling and disabling de-emphasis). This adds cost and time to product development. Accordingly, embodiments of the present disclosure are directed toward a redriver circuit that intelligently uses the limited available information from the USB link to determine the state of the USB link and to facilitate USB 3.0 compliance testing in an efficient automated manner. This can be particularly useful for preventing USB traffic from being corrupted and for providing a simple solution for companies wishing to produce USB-based products.

Aspects of the present disclosure relate to a USB 3.0 Redriver device that uses limited information from the USB traffic to determine the USB link state. The redriver can use the limited information of the status of the incoming differential voltage from the USB link. This limited information is based upon a determination of whether there is a valid differential voltage, which is sometimes referenced to as "squelch" detection. This squelch information can be used to track and follow the current state of the USB link. For instance, the redriver can first perform Receiver Detection as outlined in the USB specification. The redriver then uses squelch to detect activity (or no activity) in such a way as to detect compliance mode or normal operation (training, full power operation, low power operation, etc. . . . ). Once the redriver determines that the USB link has entered compliance mode, the redriver can then use the squelch indication to detect changes from one compliance pattern to the next. Based upon this indication, the compliance mode detection and the specific compliance pattern need to be used to enable/disable de-emphasis on each channel (upstream or downstream) to facilitate compliance mode operations. The present disclosure is not limited to the detection of compliance mode operations and can handle the USB link transitions other than compliance mode.

Consistent with various embodiments of the present disclosures, a redriver device/chip with the auto compliance detection capability discussed herein can use information about the compliance mode and/or which compliance pattern is being sent to control various features within the redriver device/chip, as needed. For instance, the redriver device can alter the squelch circuit during CP1 patterns to facilitate better handling of this very high speed pattern. This can be useful where, for instance, the squelch circuit/detector consumes significant power to support CP1 during normal operation, but during compliance mode a higher frequency squelch detector can be activated. Alternatively, squelch detection could be disabled during certain compliance patterns (e.g., during CP1 where the high speed pattern may not register under certain (low frequency) squelched detectors). Thus, a high speed pattern can be transmitted irrespective of whether the squelch detector is designed for such high speed communications. This can also be useful for reducing distortion of incoming data patterns caused by a low frequency squelch detector.

With reference to specific set of USB states, upon power up the redriver performs the receiver termination as specified in the USB 3.0 specification. Upon completion of that the redriver enters a Polling.LFPS state and waits for activity. During the Polling.LFPS state the redriver monitors for data activity on the USB link. In certain implementations, valid activity is detected by the presence any valid differential voltage (as defined in USB 3.0 specification). If no activity is detected within a set time period (360 ms as defined in USB 3.0 specification) then the redriver knows it is in a compliance mode situation and transitions to a "Compliance Mode CP0" state.

In certain embodiments, the redriver can be configured to be hard wired in a single direction ("up" being towards the USB device and "down" being towards the test equipment). In such embodiments, the redriver may not need to detect which channel contains compliance pattern data and which channel will contain LFPS signaling data.

In other embodiments, the redriver can be designed to allow the redriver to be aligned in either direction. In such embodiments, the redriver detects which channel contains compliance pattern data and which channel will contain LFPS signaling data by monitoring both channels for a valid signal/squelch. The first channel upon which active data (i.e., data is not squelched) is detected corresponds to the transmit/tx channel of the device under test, which also provides the compliance patterns.

Once the redriver determines which direction the compliance patterns and LFPS signaling are transmitted, the redriver disables the de-emphasis in the channel carrying LFPS signaling from the test equipment. The redriver then enables de-emphasis in the channel carrying compliance patterns from the USB device under test (for the first compliance pattern). The redriver then detects valid activity coming from the test equipment. In response to this detection, the redriver configures the signal conditioning according to the next compliance pattern in the sequence of compliance patterns. The redriver can be configured to use squelch detection to determine the presence of LFPS PING activity on the USB link. Accordingly, the redriver need not decode or otherwise make additional determinations as to whether or not the data is an LFPS_PING; any valid signal activity from the test equipment can be interpreted as the PING. In response, the redriver tracks the USB link state by advancing to the next "Compliance CPx" state. In this manner, the redriver is configured to track which compliance pattern is currently being sent. Based on the current compliance pattern, de-emphasis must be enabled or disabled as appropriate. For instance, USB 3.0 compliance patterns have de-emphasis enabled for all patterns except CP4, CP6, and CP8. Therefore when compliance patterns CP4, CP6, or CP8 are being sent from the USB device under test, de-emphasis can be disabled for transmission of these compliance patterns. In all other cases de-emphasis should be enabled.

Turning now to the figures, FIG. 1 depicts a block diagram of a system that includes a serial communications device and redriver circuit, consistent with embodiments of the present disclosure. A device 102 (e.g., a computer or similar host device) is designed to communicate with a remote device 106 (e.g., USB test equipment for compliance testing) using a first and a second serial-unidirectional communications channel. The serial communications compatible interface 108 allows device 102 to use the first and second channels (e.g., functioning as a bridge between a local communication protocol of device 102 and the two serial-unidirectional communications channels). The first channel allows communications from device 102 to be received at device 106, and the second channel allows communications from device 106 to be received at device 102.

The serial communications compatible interface 108 can include analog circuits/drivers 112 to drive and receive signals on the two channels as well as signals received from device 102, which can each use different protocols. A state machine 114 operates according to the proper protocols for the first and second channels. Timer 116 provides synchronization, timeouts and/or other functionality relating to the state machine 114 and the protocols for the first and second channels.

The system of FIG. 1 also includes a redriver 118 with circuitry for providing signal conditioning functions for signals on each of the two channels. The redriver 118 can be particularly useful for applications that are required to meet certain signal characteristics in order to allow the use of a transmission medium 110. Transmission medium 110 can be, for example, a conductive cable designed according to a certain specification (e.g., USB 3.0). Consistent with embodiments of the present disclosure, both redriver 118 and serial communication compatible interface 108 can be located on the same PCB 104. Optionally, device 102 can also be located on PCB 104.

The redriver 118 circuit can receive and process signals on either channel using signal conditioning circuits 120 and 126. These signal conditioning circuits can be configured to operate in a compliance testing mode by properly conditioning the signals including, but not limited to, de-emphasis. The signal conditioning circuits can also be configured to detect valid signal levels on received signals. The compliance testing mode can be tracked by a state machine 122 and/or using timers 124. The state machine 122 responds to various inputs including, but not limited to, squelch determinations regarding signals carried on the two serial-unidirectional communications channels.

In certain embodiments, redriver 118 detects that the USB link state is in the Reset/Idle stage. The USB 3.0 protocol allows this stage to be entered upon first powering up and/or upon certain reset conditions. Thus, the state machine 112 of the redriver 118 is configured to enter this state upon power and after the reset conditions. The redriver 118 also monitors for the presence of a valid load on the channels, which indicates that a device has been connected. Timer(s) 124 begin after the valid load is detected. Signal conditioning circuits 120 or 126 monitor the data lines of the channel for valid data (e.g., using a squelch detector). Timer(s) 124 are disabled/reset if valid data is detected before a timeout occurs. If, however, a timeout occurs before valid data is detected, then the redriver state machine 122 enters a compliance mode. In this compliance mode, the redriver monitors the data lines of the channels for valid data (e.g., using a squelch detector). The redriver state machine 122 tracks the different states within the compliance mode using this detection of valid data and conditions the transmitted and received data signals accordingly.

Figure 2:
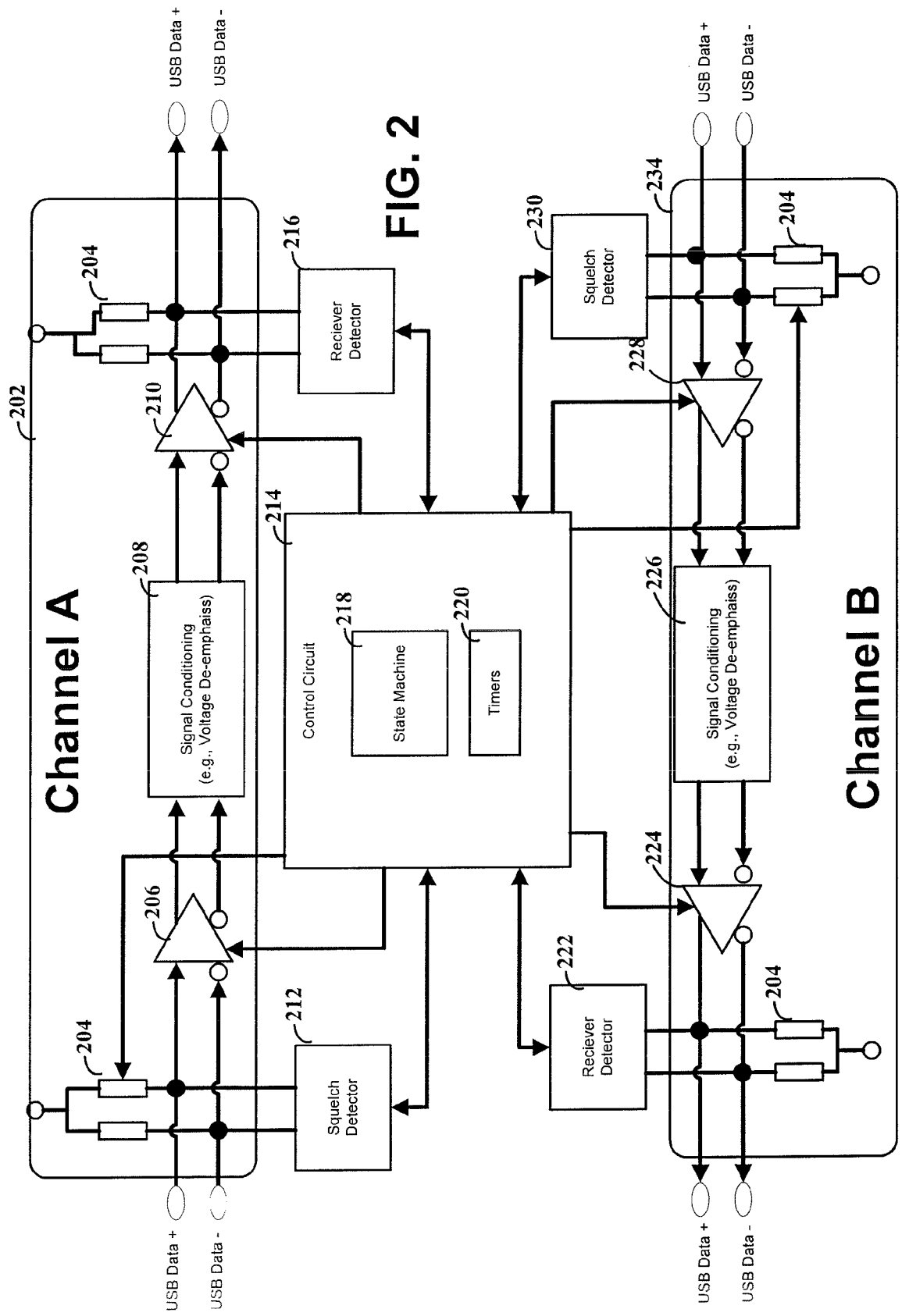
FIG. 2 depicts a block diagram for a redriver, consistent with embodiments of the present disclosure.

FIG. 2 depicts a block diagram for a redriver, consistent with embodiments of the present disclosure. The redriver is configured with a channel A (202) and a channel B (234). These channels represent unidirectional serial communications channels operating in opposite directions. Per the USB specification, the channels transmit data using differential signaling, represented by USB data+ and USB data−. These data lines are sometimes referred to as super speed receiver (or transmitter) differential pairs. Although not expressly depicted, the USB 3.0 protocol allows for legacy USB 2.0 differential data lines. The channels are each depicted as including termination components 204. These termination components can assist in signal conditioning and/or allow other devices to detect the presence of the redriver.

Signal conditioning circuits 208 and 226 maintain or return incoming signals to voltage levels and can improve current driving capabilities, rise/fall timings and other signal properties to meet the USB 3.0 protocol. The USB 3.0 specification also defines when a data signal should be modified using voltage de-emphasis. This de-emphasis can be used to compensate for the anticipated distortion USB 3.0 signal will experience. For instance, when two consecutive bits contain the same value (e.g., two '1' bits or two '0' bits), the voltage level of the second bit can be reduced through de-emphasis. In certain instances, the level of de-emphasis can be varied according to certain design considerations, such as the length of interconnect between devices and other characteristics.

Embodiments of the present disclosure also recognize that the redriver can track various other USB states, such as detecting that a U2/U3 power saving mode has been entered. The redriver can then perform power saving functions by disabling or reducing power to certain circuits (e.g., by disabling the signal conditioning circuitry and the associated power consumption.)

The channels also include differential buffers/drivers 206, 210, 224 and 228. These buffers/drivers can, among other things, provide isolation and increased current drive as well as improve rise and fall times.

Receiver detectors 222 and 216 detect when a device (external to the redriver) is connected to the corresponding USB channel. These detectors indicate the presence of a device that is actively connected to the data lines.

Squelch detectors 212 and 230 detect the presence of valid data signal levels on the inputs to their respective channels A and B. This determination indicates that a remote device is transmitting data, but does not necessarily provide any further indication as to the content of the transmitted data.

Control circuit 214 includes logic circuitry for receiving various inputs and providing disable/enable signals to the various components of the redriver. The control circuit 214 can operate according to a state machine 218. The state machine 218 can receive inputs from various components and from timers 220. These inputs can include, but are not necessarily limited to, inputs from squelch detectors 212, 230 and from receiver detectors 216, 222. Control circuit 214, including the functionality of state machine 218, can be implemented using a variety of different logic components, processors, and associated configuration data that can be used in conjunction with stored programming instructions.

Figure 3:
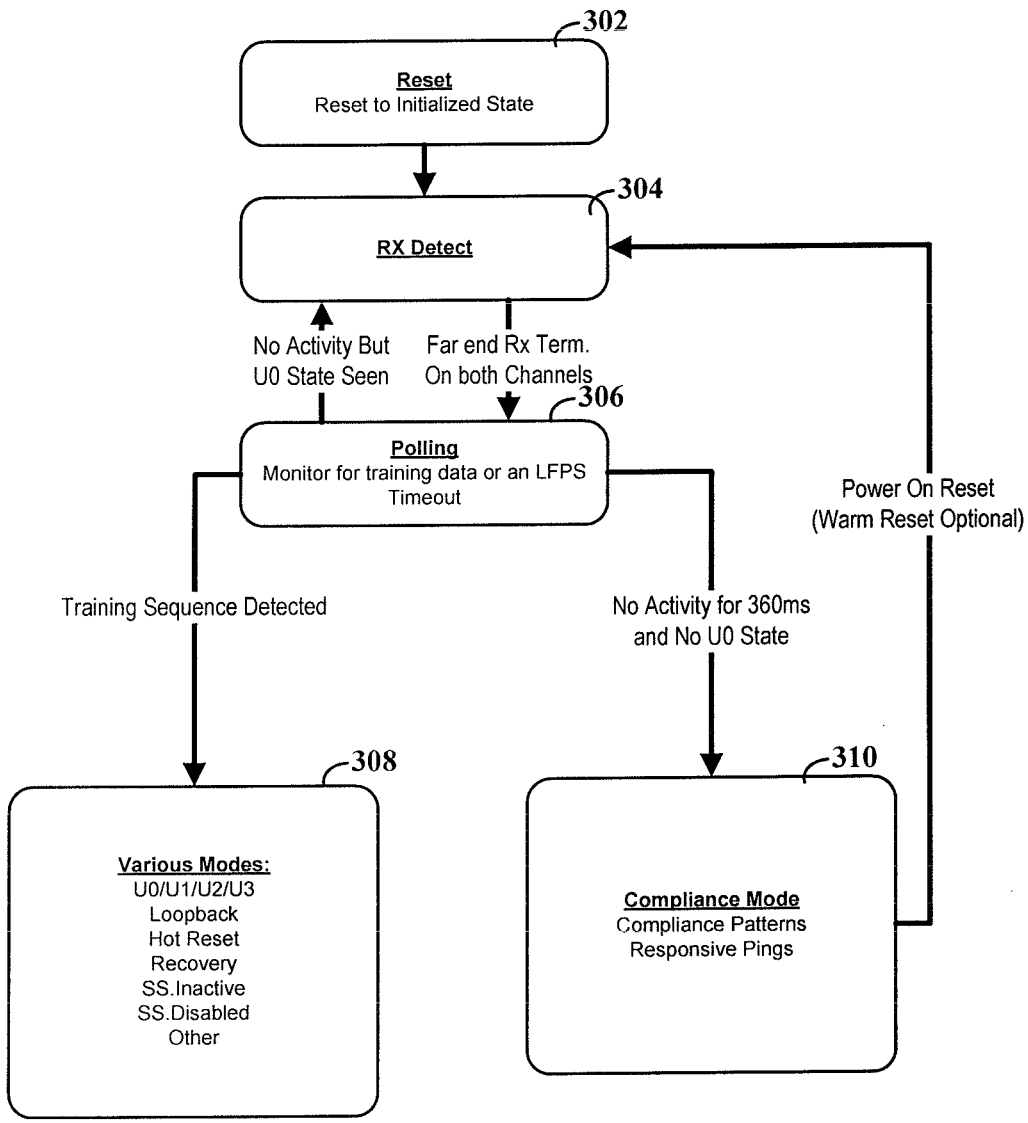
FIG. 3 depicts a flow diagram for a redriver circuit, consistent with embodiments of the present disclosure.

FIG. 3 depicts a flow diagram for a redriver circuit, consistent with embodiments of the present disclosure. Upon startup, the redriver circuit enters the reset/idle state 302. During this state, the redriver circuit initializes itself and can monitor for valid power. Once valid power has stabilized and the redriver is properly initialized, the redriver assumes that the USB system has entered the RX Detect state 304. During the RX_Detect state 304, the redriver monitors to determine whether a device is actively connected to a receive channel (e.g., by detecting the presence or absence of receiver termination).

Once such a device is detected, the redriver determines that the USB system has entered the polling state 306. During the polling state 306, normal operation involves one device providing training data to the other device. In response to this training data, the USB system enters various modes 308 that allow for communications between devices (e.g., modes U0, U1, U2 and/or U3). In another situation, however, one of the devices is a test device that is designed to verify the USB compatibility of the other device. In such a situation, the test device will not provide training data. The redriver can monitor for the training data by monitoring for valid differential signal voltage from the USB link (e.g., using a squelch detector).

When a set time period (360 ms) expires without detection of any such training data, the redriver determines that the USB system has entered the compliance mode state 310. During the compliance mode state 310, the redriver monitors for compliance patterns. In certain embodiments, the redriver does not know from which direction the compliance patterns will originate. Accordingly, the redriver circuit can monitor both receive channels for valid signal levels on the differential signals. The redriver determines that all compliance patterns will originate from the first channel that is detected to have a valid signal level and that the responsive pings (LFPS) will originate from the other channel.

The redriver can also monitor for events that indicate that the USB system has been reset, and thus, might otherwise allow the USB system to enter the compliance mode 310 at times other than after initial power is provided. These events can include, but are not necessarily limited to, a warm reset, a power on reset and an LFPS handshake timeout.

Figure 4:
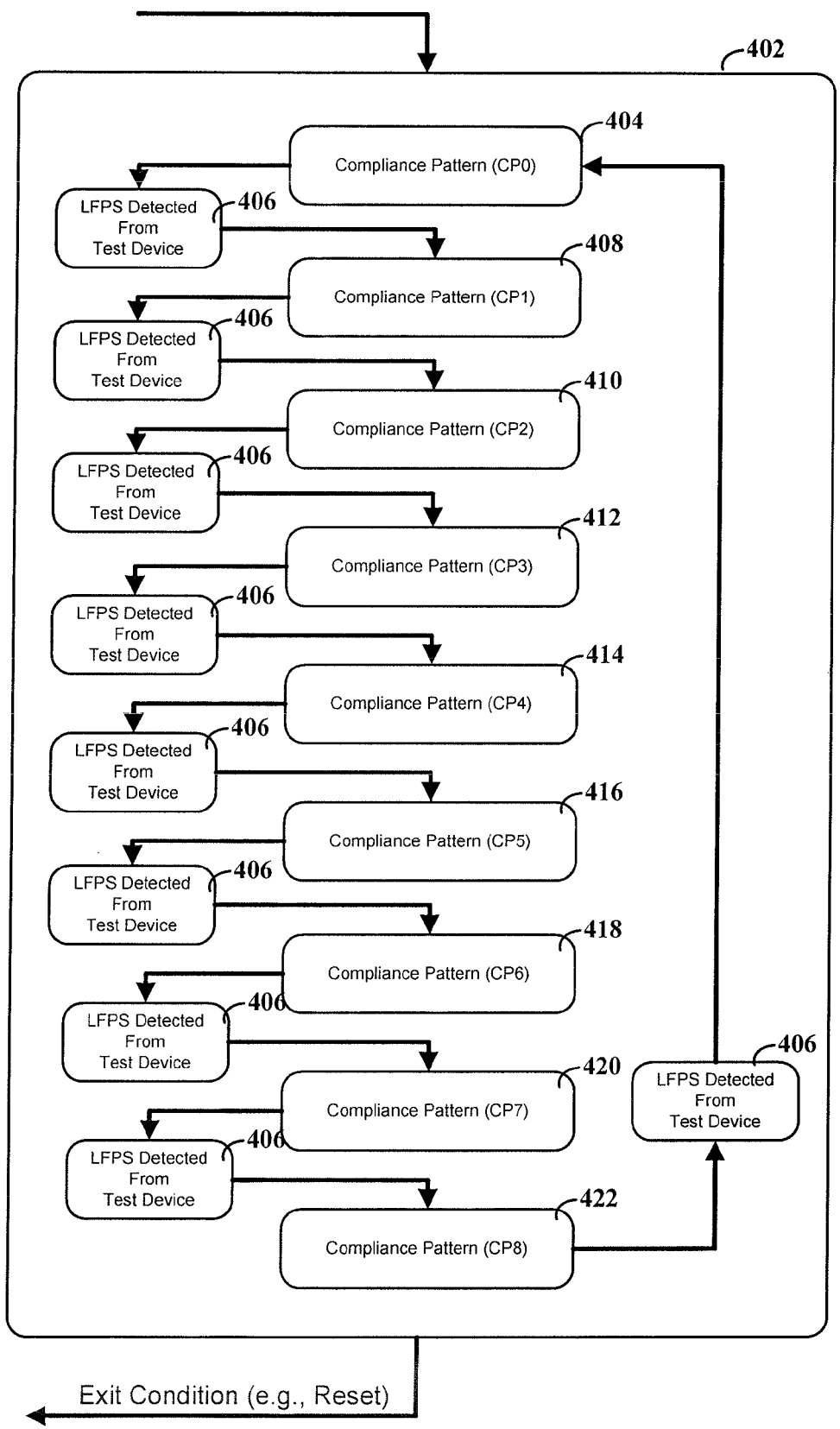
FIG. 4 depicts a flow diagram for operations occurring during compliance mode, consistent with embodiments of the present disclosure.

FIG. 4 depicts a flow diagram for operations occurring during compliance mode, consistent with embodiments of the present disclosure. The compliance mode 402 is entered when no activity has been detected and when the U0 state has not been previously entered (assuming no recent power on reset has occurred). The redriver detects a first compliance pattern 404 (CP0), which can determine which channel carries the compliance pattern data. This detection can be accomplished using a squelch detector, which can be particularly useful for avoiding more complex operations, such as decoding the data bits or synchronizing.

The redriver can then detect 406 a LFPS from the other channel and the test device (also using a squelch detector). The redriver then configures the signal conditioning according to the next compliance pattern 408 (CP1). For instance, USB 3.0 compliance patterns have de-emphasis enabled for all patterns except CP4, CP6, and CP8. Therefore when compliance patterns CP4, CP6, or CP8 are being sent from the upstream USB device, de-emphasis must be disabled for the purposes of transmitting these compliance patterns. In all other cases de-emphasis should be enabled. This process repeats for 410-422 and compliance patterns CP2-CP8. The compliance patterns can be repeated until an exit condition is detected, such as a reset.

Figure 5:
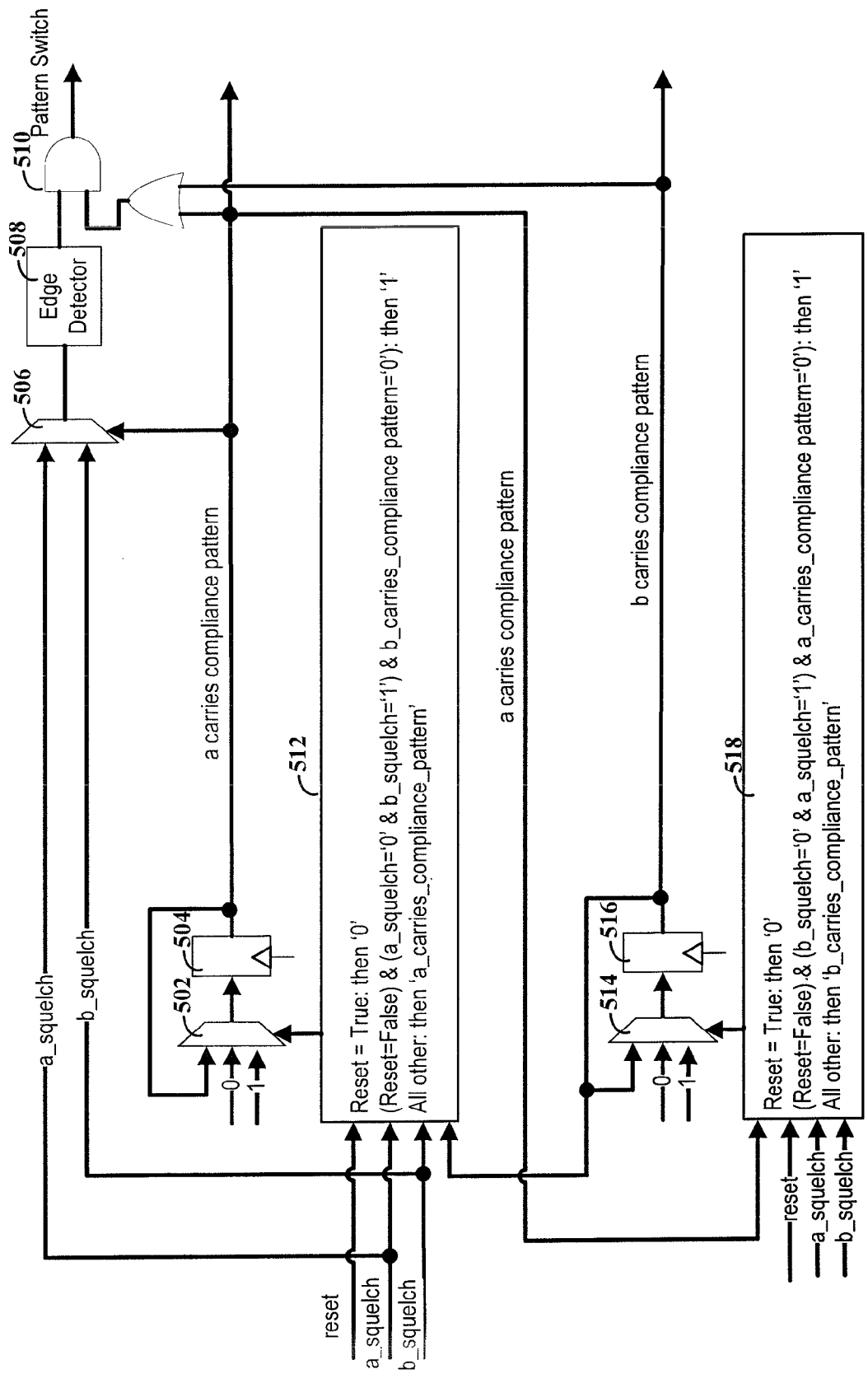
FIG. 5 depicts a circuit diagram for detecting which channel carries compliance pattern data and which carries LFPS Ping data from the Test Equipment, consistent with embodiments of the present disclosure.

FIG. 5 depicts a circuit diagram for detecting which channel carries compliance pattern data and which carries LFPS Ping data from the Test Equipment, consistent with embodiments of the present disclosure. In response to compliance mode being entered, the circuit detects which channel starts signaling first (using squelch monitors for both channel A and channel B). The circuit is configured to set the "a_carries_compliance_pattern" and "b_carries_compliance_pattern" according to which channel (A or B) is determined to be the source of the compliance patterns.

The function of the circuit provides that, during compliance mode, the first channel having a valid signal is assumed to be the channel over which compliance patterns will be sent. The other channel is assumed to be the one over which the LFPS.PING signaling will be sent. The State Machine will normally hold this logic in reset (reset=0) during which both a_carries_compliance_pattern and b_carries_compliance_pattern are cleared. When the redriver determines that the USB system has entered compliance mode, the logic reset is removed and the circuit will be enabled. The first channel to have its corresponding squelch input go low will be declared the "compliance pattern channel" (a_carries_compliance_pattern or b_carries_compliance_pattern).

Logic blocks 512 and 518 depict the logic for controlling multiplexors 502 and 514, respectively. Thus, when reset is present/true, the multiplexors 502 and 514 are configured to output a '0' where '0' represents that the channel does not carry a compliance pattern. If reset has been removed, then the default state is to maintain the current value for the output. This can be accomplished by providing a feedback loop that includes a register 504/516 for maintaining the current value. The logic blocks set their respective compliance pattern output to a '1' in response to a squelch detection (a/b_squelch) on the same channel not being present, a squelch detection on the other channel being present and the other channel has not previously set its compliance pattern directional determination signal (a/b_carries_compliance_pattern). This feedback between a_carries_compliance_pattern and b_carries_compliance_pattern allows the redriver to hold the outputs constant once it detects over which channel the compliance patterns are sent.

The circuit is also configured to detect the falling edge (edge detector 508) on the squelch coming from the channel which is expected to be carrying the LFPS signaling (using multiplexor 506). This output can be used to signal that the device under test is switching to the next compliance pattern. The redriver also masks (AND gate 510) this falling edge detection until it has determined which channel is carrying compliance pattern data and which is carrying LFPS signaling.

The signals and associated logic and functionality described in connection with FIG. 5 can be implemented in a number of different manners. For instance, combination logic can be used in place of multiplexors. In another instance, signals can be changed from active high to active low or from active low to active high.

Unless otherwise indicated, various general purpose systems and/or logic circuitry may be used with programs in accordance with the teachings herein, or it may prove convenient to construct more specialized apparatus to perform the required method. For example, one or more of the methods according to the present disclosure can be implemented in hard-wired circuitry, by programming a general-purpose processor, other fully or semi-programmable logic circuitry, and/or by a combination of such hardware and a general-purpose processor configured with software.

One of skill in the art would appreciate that aspects of the disclosure can be practiced with computer system configurations other than those expressly described herein. The required structure for a variety of these systems and circuits would be apparent from the intended application and the above description.

It is to be understood that various terms and techniques are used by those knowledgeable in the art to describe communications, protocols, applications, implementations, mechanisms, etc. One such technique is the description of an implementation of a technique expressed in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting "C=A+B" as an additive function whose implementation in hardware and/or software would take two inputs (A and B) and produce a summation output (C), such as in combinatorial logic circuitry. Thus, the use of formula, algorithm, or mathematical expression as descriptions is to be understood as having a physical embodiment in at least hardware (such as a processor in which the techniques of the present disclosure may be practiced as well as implemented as an embodiment).

In an embodiment, machine-executable instructions can be stored for execution in a manner consistent with one or more of the methods of the present disclosure. The instructions can be used to cause a general-purpose or special-purpose processor that is programmed with the instructions to perform the steps of the methods. Alternatively, the steps might be performed by specific hardware components that contain hardwired logic for performing the steps, or by any combination of programmed computer components and custom hardware components.

In some embodiments, aspects of the present disclosure may be provided as a computer program product which may include a machine or computer-readable medium having stored thereon instructions which may be used to program a computer (or other electronic devices) to perform a process according to the present disclosure. Accordingly, the computer-readable medium includes any type of media/machine-readable medium suitable for storing electronic instructions.

Based upon the above discussion and illustrations, those skilled in the art will readily recognize that various modifications and changes may be made without strictly following the exemplary embodiments and applications illustrated and described herein. For instance, modifications from the current 3.0 USB specification could occur and result in changes to the corresponding state machine functionality. Such modifications do not depart from the true spirit and scope of the present disclosure, including that set forth in the following claims.

What is claimed is:

1. A method for configuring a redriver circuit to process received compliance patterns for a compliance test mode, the method comprising:

detecting a compliance test mode for a redriver circuit having a first input port and a second input port by detecting the presence of a remote receiver termination on both the input ports;

monitoring both the input ports to detect received data; and
entering the compliance test mode in response to no received data being detected on the input ports for a set period of time;
tracking compliance patterns by monitoring for valid signal levels on the second input port; and
enabling and disabling de-emphasis on the first input port in response to the tracked compliance patterns.

2. The method of claim 1, wherein the compliance test mode is compatible with the Universal Serial Bus (USB) 3.0 protocol.

3. The method of claim 2, further including the step of monitoring for entrance of into a U0 USB 3.0 link state and wherein the step of entering compliance test mode is further in response to not having detected entrance into the U0 link state.

4. The method of claim 1, further including the steps of monitoring, after entering compliance test mode, both the first input port and the second input port for a valid signal, determining that the first input port carries compliance patterns by detecting a valid signal on the first input port without first detecting a valid signal on the second input port, and wherein the step of enabling and disabling de-emphasis on the first input port is in response to determining that the first input port carries compliance patterns.

5. The method of claim 1, further including disabling de-emphasis for compliance patterns 4, 6, and 8 and enabling de-emphasis for compliance patterns 1-3, 5, and 7.

6. The method of claim 1, further including the steps of tracking compliance patterns by monitoring for valid signal levels on the second port and by disabling the de-emphasis on the first port in response to using detected valid signal levels on the second port to track compliance patterns on the first port.

7. The method of claim 1, further including the step of tracking compliance patterns by using a squelch monitor on the second port to detect one of a standard LFPS ping and a non standard LFPS ping.

8. A method comprising:
  detecting a compliance mode for a redriver circuit having a first input port and a second input port by
  detecting the presence of a remote receiver termination on both the input ports;
  monitoring both input ports to detected received data; and
  determining compliance mode in response to no received data being detected on the input ports for a set period of time;
  monitoring each input port to detect a valid data signal level;
  determining a compliance pattern has been received by detecting a valid signal level on the first input port, and
  configuring, in response to detecting a valid signal level on the first input port, the first input port with de-emphasis and the second input port without de-emphasis.

9. The method of claim 8, further including the steps of tracking compliance patterns by monitoring for valid signal levels on the second input port and by disabling the de-emphasis on the first input port in response to using detected valid signal levels on the second input port to track compliance patterns on the first input port.

10. The method of claim 9, wherein the de-emphasis is disabled for compliance patterns 4, 6, and 8 and wherein the de-emphasis is enabled for compliance patterns 1-3, 5, and 7.

11. The method of claim 8, wherein the re-driver circuit is compliant with the Universal Serial Bus (USB) 3.0 protocol.

12. The method of claim 8, further including the step of tracking compliance patterns by using a squelch monitor on the second input port to detect one of a standard LFPS ping and a non-standard LFPS ping.

13. A circuit comprising:
  logic circuitry configured for
    detecting a compliance test mode for a redriver circuit having a first input port and a second input port by
    detecting the presence of a remote receiver termination on both input ports;
  monitoring both input ports to detected received data; and
  entering compliance test mode in response to no received data being detected on the input ports for a set period of time;
  tracking compliance patterns by monitoring for valid signal levels on the first input port; and
  disabling de-emphasis on the first input port in response to the tracked compliance patterns.

14. The circuit of claim 13, further including control circuitry configured to determine an upstream or downstream direction of the compliance test mode and to provide de-emphasis on either the first or second input port in response to the determination of direction.

15. The circuit of claim 14, wherein the control circuitry is further configured to detect low frequency period signaling (LFPS) pings on the other of the first and second port in response to the determination of direction, and to provide de-emphasis control for a currently-provided compliance pattern.

16. The circuit of claim 13, wherein the redriver circuit is configured to disable de-emphasis on a channel determined to carry LFPS ping data.

17. The circuit of claim 14, wherein the redriver circuit is configured to make the determination of direction of a compliance test mode without using clock and data recovery circuits.

18. The circuit of claim 13, wherein logic circuitry is further configured to disable de-emphasis for compliance patterns 4, 6, and 8 and to enable de-emphasis for compliance patterns 1-3, 5, and 7.

19. The circuit of claim 13, wherein the re-driver circuit is compliant with the Universal Serial Bus (USB) 3.0 protocol.

20. The circuit of claim 13, further including squelch detectors configured to monitor both input ports to detected received data.

* * * * *